United States Patent [19]

Steger et al.

[11] Patent Number: 4,828,230
[45] Date of Patent: May 9, 1989

[54] DUAL ACTING HYDRAULIC ACTUATOR FOR ACTIVE SUSPENSION SYSTEM

[75] Inventors: Charles B. Steger; Kenneth R. Meloche, both of Warren, Mich.

[73] Assignee: General Motors Corporation, Detroit, Mich.

[21] Appl. No.: 186,754

[22] Filed: Apr. 26, 1988

Related U.S. Application Data

[63] Continuation of Ser. No. 1,381, Jan. 8, 1987, abandoned.

[51] Int. Cl.$^4$ ............................................. F16F 5/00
[52] U.S. Cl. ............................... 267/64.16; 267/64.13; 267/64.17; 267/64.26; 267/64.28; 267/140.2
[58] Field of Search ............... 267/64.28, 64.13, 64.11, 267/140.2, 64.15, 64.16, 64.24, 64.26, 64.17; 92/52, 53

[56] References Cited

U.S. PATENT DOCUMENTS

| | | | |
|---|---|---|---|
| 3,041,062 | 6/1962 | Bliven | 267/64 |
| 3,149,830 | 9/1964 | Broadwell | 267/64.28 |
| 3,524,658 | 8/1970 | Carbon | 267/64.26 |
| 3,687,483 | 8/1972 | Gull et al. | 280/124 |
| 3,836,166 | 9/1974 | Bainbridge et al. | 267/64.16 |
| 3,945,300 | 3/1976 | Bourges | 92/52 |
| 3,970,292 | 7/1976 | Dachicourt et al. | 267/64.28 |
| 4,655,440 | 4/1987 | Eckert | 267/64.16 |

FOREIGN PATENT DOCUMENTS

939849  6/1982  U.S.S.R. ................. 92/52

Primary Examiner—Andres Kashnikow
Assistant Examiner—Mark T. Le
Attorney, Agent, or Firm—Charles R. White

[57] ABSTRACT

Active suspension for vehicles with a dual acting hydraulic actuator providing foreshortened overall length for a given amount of stroke. A conventional suspension unit when designed to give appropriate wheel travel protruded through the hood. The cylinder tube of the actuator of this invention makes use of concentric tubes proportioned to provide the same pressure-force relationship in both directions and to be no larger than the conventional unit. This actuator also incorporates a trapped air volume that is separate from the oil volumes. This air volume can be appropriately sized so that an air-spring is created by the moving piston. The air spring is of approximately the correct load an rate for the vehicle. This removes the requirement for carrying static vehicle load from the hydraulic portion of the device, which reduces power consumption. This eliminates the requirement for a coil spring around the actuator to carry these static loads and provides a "limp-home" capability in the event that the hydraulic system becomes damaged.

4 Claims, 2 Drawing Sheets

DUAL ACTING HYDRAULIC ACTUATOR FOR ACTIVE SUSPENSION SYSTEM

This is a continuation of application Ser. No. 001,381, filed on Jan. 8, 1987 abandoned.

This invention relates to a new and improved dual acting hydraulic actuator with an involuted cylinder tube configuration to foreshorten overall length for use in an active vehicle suspension. The actuator also incorporates a trapped air volume separate from the hydraulic portion of the unit to provide an air suspension spring integrated within the actuator.

The hydraulically powered and dual acting actuators of this invention are telescopically adjustable to roll the vehicle to selected roll angles for stabilized cambering turns for a wide range of vehicle speed and road curvatures. In addition to maintaining coordinated vehicle turns under steady state conditions for an infinite number of vehicle operating speeds, this actuator, in an appropriate control system, has the capability of making fast transient responses to steering commands to change from one roll angle to another and erects the vehicle for straight ahead driving or when stationary.

It is a feature, object and advantage of this invention to provide a new and improved dual acting hydraulic cylinder for each road wheel of a vehicle providing control of suspension loads and deflection, such as, but not limited to, powered leaning of the vehicle and for damping ride motions of the vehicle, in a manner not possible with conventional suspension elements.

It is another feature, object and advantage of this invention to provide a dual acting hydraulic cylinder which has a foreshortened overall length for a given amount of stroke so that it can be effectively employed as an active suspension unit for vehicles.

Another feature, object and advantage of this invention is to provide a dual acting hydraulic actuator for an active vehicle suspension with a power cylinder having substantially concentric tubes proportioned to provide the same pressure force relationship when elongating or contracting with the piston mounted for telescopic movement within an involuted cylinder tube and having equal pressure areas to provide a wide range of positions and to provide an infinite number of adjusted positions from a full jounce or collapsed position to a full rebound or extended position.

Another feature, object and advantage of this invention is to provide a trapped air volume separate from the oil volumes of the hydraulic actuator. The air volume is sized so that an air spring is created by the moving piston. With this air spring, the requirement for carrying the static load is removed from the hydraulic portion of the actuator thereby substantially reducing power consumption. This eliminates the requirement for coil springs around the actuator, or other mechanical spring means, to carry the static load and provide sufficient suspension in the event that the hydraulic system is damaged so that its lifting force is reduced.

These and other features, objects and advantages of this invention will become more apparent from the following detailed description and drawing in which:

FIG. 1 is a cross-sectional view of an actuator in a powered collapsed position.

FIG. 2 is a cross-sectional view of the actuator of FIG. 1 in a powered extended position.

Figures 1, 2:
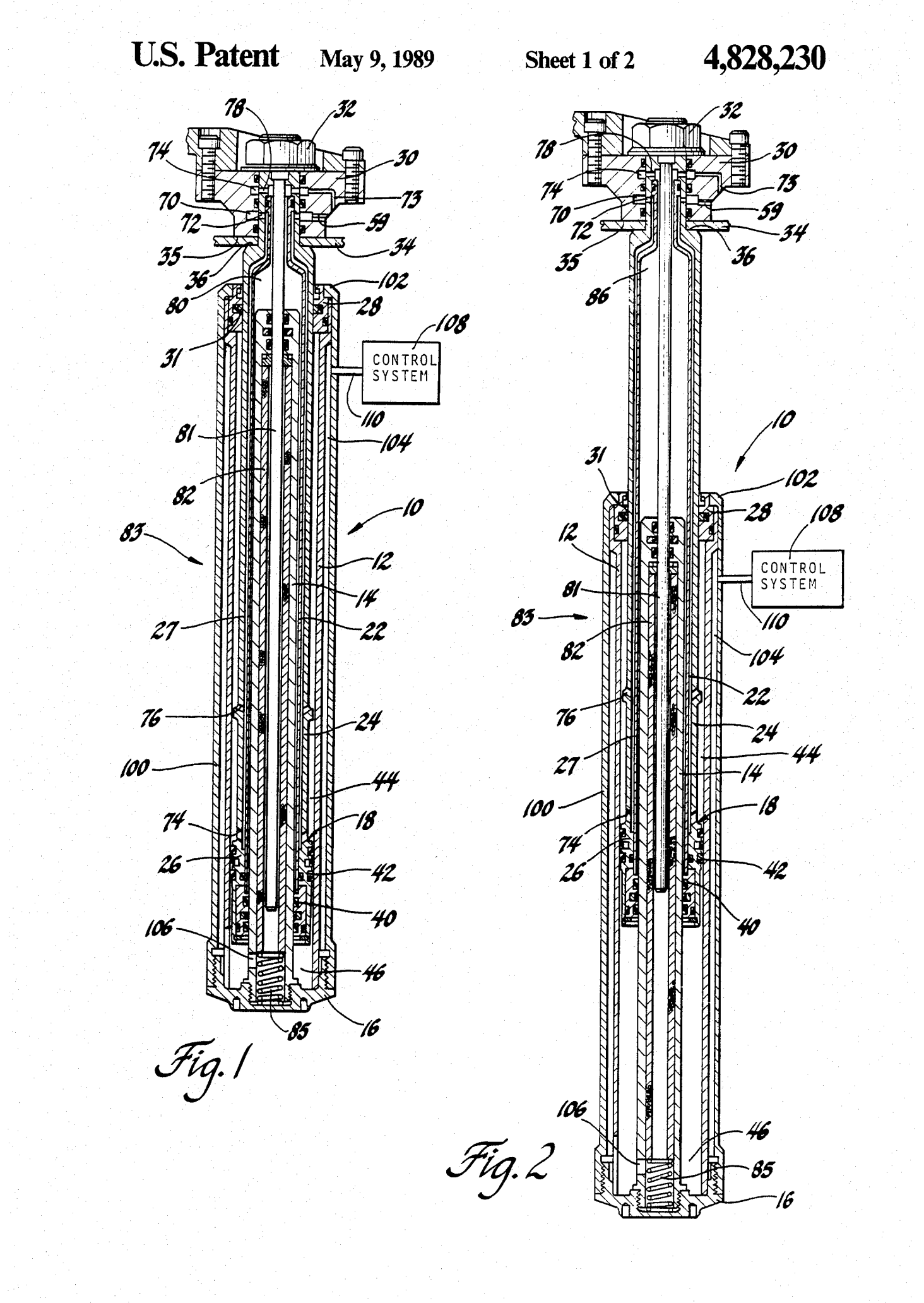
Figure 3:
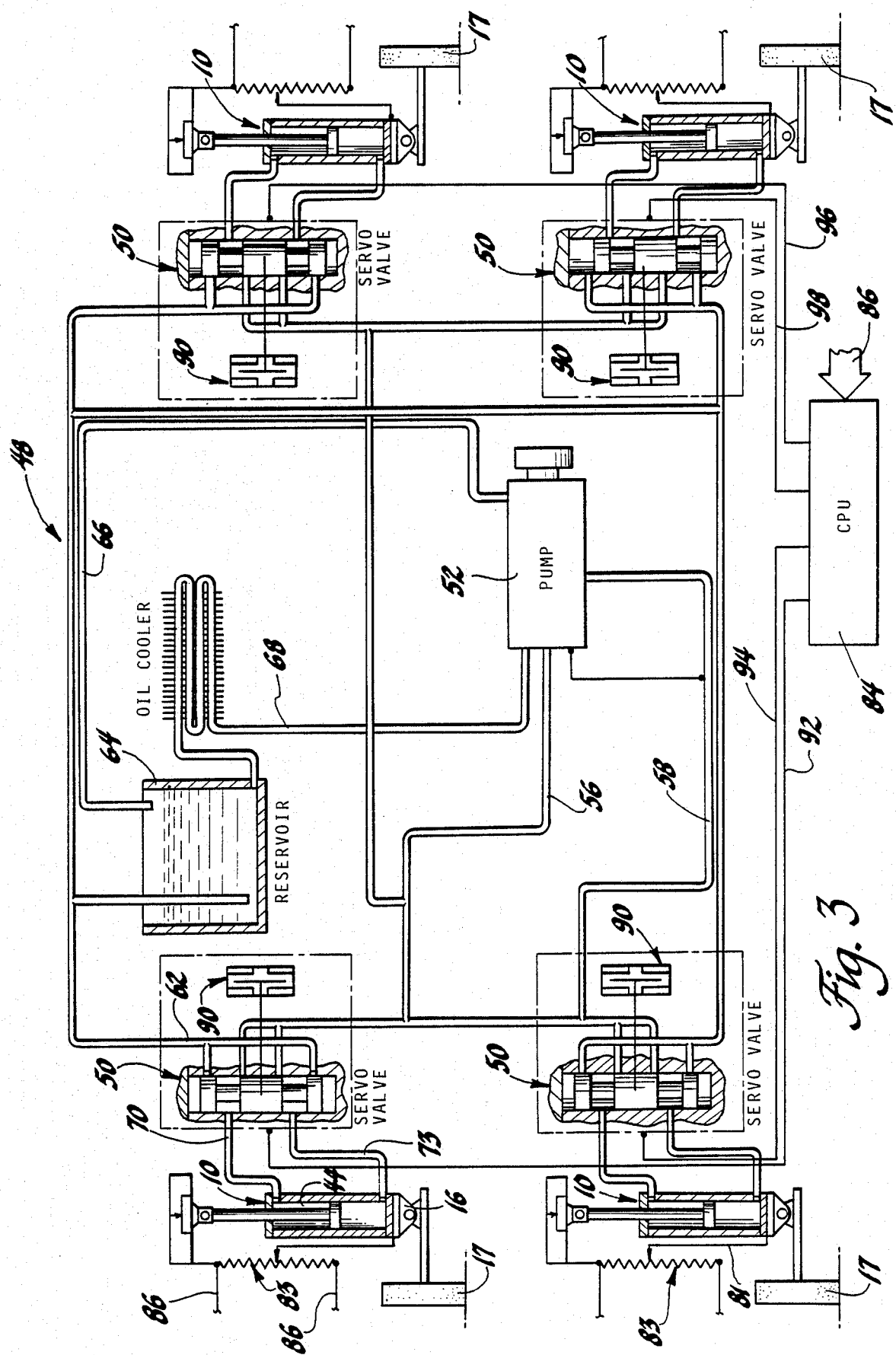
FIG. 3 is a diagrammatic view of part of a control system for an active suspension system incorporating the actuators of this invention.

Turning now in greater detail to the drawing, there is shown in FIGS. 1 and 2, a dual acting active suspension unit 10 for a vehicle designed to replace passive conventional struts such as the well known MacPherson type suspension strut. The unit 10 is foreshortened by an involuted cylinder tube assembly formed from an outer cylinder tube 12 and an inner cylinder tube 14 interconnected at their lower ends by a base cup 16. As diagrammatically shown in FIG. 3, a unit 10 is located at each corner of a vehicle and is adapted to be connected to a road wheel assembly 17. This inversion importantly foreshortens the unit 10 for optimum space utilization so that they can be readily employed in place of conventional strut configurations and selectively powered and elongated for coordinated vehicle roll purposes.

Each unit 10 has a piston assembly 18 reciprocally mounted with respect to the cylinder tube assembly and has concentric inner and outer piston rods 22, 24 connected at their lower ends to a cylindrical piston 26. The concentric piston rods 22, 24 define an oil passage 27 therebetween and extend upwardly through cylindrical rod guide 28 into an upper connector block 30. The rod guide has annular seal 31 for sliding sealed contact with outer piston rod 24 as it strokes in jounce and rebound action. Nut 32 threaded onto the upper end of the piston rod 24 fastens the piston rods to the connector block and to the vehicle body, here represented by a portion of a conventional mounting tower 34 trapped between a lower surface 35 of the connector block 30 and an upper shoulder 36 of the outer piston rod 24. The vehicle body is thus rigidly interconnected with the piston of unit 10 and moves therewith.

The piston 26 is mounted for reciprocating movement in a cylindrical space between the outer and inner cylinder 12, 14 tubes and carries inner and outer O-ring seals 40, 42 to hydraulically and pneumatically seal this cylindrical space into expansible and contractible upper and lower chambers 44 and 46. The upper chamber 44 is an oil chamber supplied with pressurized oil from a control system 48, basically illustrated in FIG. 3, that incorporates a separate servo valve 50 for each of the suspension units 10. Pressure oil for the servo valves 10 is supplied from pump 52 through lines 56, 58 as schematically shown in FIG. 3. Fluid exhausted from the servo valves 50 is transmitted by lines 62 to a reservoir 64. The pump 52 draws oil from reservoir 64 through line 66 and 68 via oil cooler 69 as diagrammatically shown.

In a downward shifted position of the spool of valve 50, pressure oil is fed from pressure line 56 by passage 59 into an annular chamber 70 in the connector block 30 and through fed through a radial passage 72 in the upper end of the outer piston rod 24. Pressure oil accordingly fills the space between the inner and outer piston rods 22 and 24 and through openings 74, 76 fills the space between the outer piston rod 24 and the cylinder tube. The upper chamber 44 is accordingly, filled with pressure oil that exerts a downward force on piston 26. When this pressure exerts a force of sufficient magnitude, chamber 44 expands to shorten the actuator unit. As shown in FIG. 1, the chamber 44 is fully expanded and the actuator unit is at its collapsed position.

In addition to supplying pressure oil to the upper chamber 44, the servo valve 50 is shiftable upwardly to supply pressure oil to the inner chamber 80 formed between the inner cylinder tube 14 and the inner piston rod 22 as with chamber 44, this pressure oil is routed by the servo valve 50 through the line 73 into annular chamber 74 in the connector block 30. This pressure oil is then fed through radial passage 78 in the neck of the outer piston rod into the inner chamber 80. When pressure in this chamber is raised beyond a predetermined pressure, the resulting force in chamber 80 acts on the walls thereof and on the end of the inner tube to linearly expand chamber 80 to a predetermined length. FIG. 2 shows chamber 80 fully expanded although an infinite number of positions in between FIGS. 1 and 2 can be obtained by force equilibrium in the expansion and contraction chambers.

An elongated cylindrical ferrous rod 81 fixed to the top of the outer piston rod extends into a coil 82 that is mounted within the confines of the inner piston rod 22 and is retained in position by helical spring 85. A load sensor 89 is operatively mounted at the upper end of each piston rod assembly and is connected in circuit 86. The rod 81 and coil 82 cooperate to form a linear variable differential transformer 83 which provides a displacement signal that is transmitted to a computer 84 through circuit 86. The computer 84 receives continuous signals during vehicle operation such as vehicle loading, speeds, bank angle, road curvature, lateral acceleration and road undulations. These signals are processed by the computer which provides a control signal to the servo valve 50. The servo valves 50 are actuated by torque motors 90 which correspond to the torque motors disclosed in the MOOG(R) Aerospace Group Catalog 301882 hereby incorporated by reference. Signals from the computer 84 are supplied through circuits 92, 94, 96 and 98 to the torque motor 90 for each actuator. Depending on the input signals 86 into the computer, the torque motors accordingly adjust the servo valves so that the dual acting actuators are adjusted to actively lean the vehicle into turns to provide coordinated steady state turning for a wide range of operating conditions and erect the vehicle for straight ahead driving and for standing still. Dampening is provided by the restriction in the servo valve as provided by spool adjustment. Different sensors along with different control algorithms in the controller can cause this control or any other control to theoretically exist. Roll and pitch control, damping and spring rate control can be synthesized by the system.

The preferred embodiment of this invention features air suspension of the vehicle with an outer support tube 100 threaded or otherwise fixed to the base cup 16. This outer tube extends upwardly therefrom to an inwardly turned and air sealed connection 102 with the rod guide 28. The support tube 100 is spaced from the outer cylinder tube 12 to form a cylindrical space 104 therebetween that is connected to the lower chamber 46 by a radial passage 106 in the lower end of the cylinder tube 14. Pressurized suspension air from a control system 108 is supplied into the space 104 and the lower chamber 46 via line 110. Pressure air acting in the lower chamber 46 provides the air suspension force for this unit. This trapped air volume is separate from the oil volumes and is appropriately sized so that an air-spring is created by the moving piston. The size of the device is such that the air spring is of approximately the correct load and rate for the vehicle. This removes the requirement for carrying static vehicle load from the hydraulic portion of the device, which substantially reduces power consumption. This eliminates the requirement for a coil spring around the actuator or other suspension device to carry these static loads and provides a "limp-home" capability if the hydraulic system is damaged and does not work.

While a preferred embodiment of this invention has been shown and described, other embodiments will now become apparent to those skilled in the art. Accordingly, the scope of this invention is set forth in the following claims.

The embodiments of the invention in which an exclusive property or privilege is claimed are defined as follows:

1. A hydraulically powered telescoping actuator for an active suspension system of a wheeled vehicle and operatively connecting a road wheel assembly to support structure of the vehicle comprising concentric inner and outer cylinder tubes having substantially the same operating length and rigidly connected together at their lower ends to form an involuted cylinder tube assembly and defining a cylindrical space therebetween with substantially constant internal and external diameters, a piston mounted for reciprocating movement in said cylindrical space and slidably contacting the outer wall of said inner cylinder and the inner wall of said outer cylinder substantially throughout the length thereof, a piston rod guide secured to the upper end of said outer cylinder tube, piston rod means operatively connected to said piston for telescopic movement with respect to said cylinder tube assembly and extending upwardly therefrom through said rod guide for connection with the support structure of the vehicle, said piston having an annular inner seal for slidably sealing contact with the outer wall of said inner cylinder tube substantially all along the length thereof so that a variable volume actuator expansion chamber is formed above said piston and having an annular outer seal for sliding sealing contact with one inner wall of said outer cylinder tube substantially along the length thereof so that a variable volume actuator contraction chamber is formed above said piston, said piston rod means having first hydraulic passage therein operatively connected to said actuator contraction chamber, said piston rod means having second hydraulic passage means therein operatively connected to said actuator expansion chamber, control means for supplying a pressurized hydraulic fluid to said first passage and said contraction chamber to cause the expansion thereof and the contraction of said actuator, said control means being conditionable to supply a pressurized fluid to said second passage and said expansion chamber to cause the expansion thereof and the expansion of said actuator.

2. The hydraulic powered telescoping actuator of claim 1 wherein said cylinder tubes and said piston define a variable volume pneumatic chamber beneath said piston, an outer support tube extending around said unit and having sealed engagement therewith and forming an air passage therebetween and operatively connected to said pneumatic chamber beneath said piston, and means for supplying pressurized air into said air chamber to the underside of said piston to support the weight of the vehicle through a predetermined pneumatic pressure supplied to said pneumatic chamber and said piston and means for varying said pressure of said air in said chamber to provide a variable suspension spring system for said actuator.

3. A hydraulically powered telescoping actuator for an active suspension system of a wheeled vehicle and operatively connecting a road wheel assembly to support structure of the vehicle comprising concentric inner and outer cylinder tubes of substantially the same length to form an involuted cylinder tube assembly and defining a cylindrical space therebetween with substantially constant inner and outer diameters throughout the length thereof, a piston mounted for reciprocating movement in said cylindrical space, a piston rod guide secured to the upper end of said outer cylinder tube, a piston rod assembly defined by radially spaced and concentric inner and outer tubular piston rod elements operatively connecting to said piston and extending upwardly therefrom through said rod guide for connection with the support structure of the vehicle, said piston having an annular inner seal for sealing with said inner cylinder and an annular outer seal for sealing contact with said outer cylinder so that a first variable volume chamber is formed above said piston, said inner and outer piston rod elements defining a hydraulic passage therebetween operatively connected to said first chamber, control means for supplying a pressurized hydraulic fluid to said first chamber through said hydraulic passage to cause the expansion thereof and the contraction of said actuator, said inner and outer piston rods mounted for telescopic movement over said inner cylinder tube and said piston being in sealed engagement with said inner cylinder tube defining a second variable volume chamber therebetween, said control means being further adapted to supply a pressurized fluid to said second chamber to cause the expansion thereof and the expansion of said actuator.

4. The hydraulic powered telescoping actuator of claim 3 and further incorporating an outer support tube extending around said unit and having sealed engagement therewith and forming a variable volume air chamber therebetween and beneath said piston and control means for supplying a pressure air into said air chamber to support the weight of the vehicle through a predetermined pressure supplied to said chamber said piston and means defined by said last mentioned control means for varying said pressure in said air chamber to provide a variable suspension spring system for said actuator.

* * * * *